United States Patent
Pettigrew (10) Patent No.: US 7,283,148 B2
(45) Date of Patent: Oct. 16, 2007

(54) OPTICALLY MARKING THE LABEL SIDE OF AN OPTICAL DISC

(75) Inventor: David Pettigrew, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 356 days.

(21) Appl. No.: 10/835,720

(22) Filed: Apr. 30, 2004

(65) Prior Publication Data

US 2005/0243160 A1 Nov. 3, 2005

(51) Int. Cl.
*B41J 2/435* (2006.01)
*G11B 7/00* (2006.01)

(52) U.S. Cl. ...................... 347/224; 369/100

(58) Field of Classification Search ........ 347/224–225, 347/251–254; 400/61; 369/53.18, 13.54, 369/284, 44.39, 100; 384/110
See application file for complete search history.

(56) References Cited

U.S. PATENT DOCUMENTS 5,517,477 A * 5/1996 Sako .................. 369/53.18
5,915,858 A * 6/1999 Wen ........................ 400/61
6,962,442 B2 * 11/2005 Braun ...................... 384/110
2003/0108708 A1 6/2003 Anderson et al.
2003/0231561 A1 12/2003 Morishima
2004/0037176 A1 2/2004 Morishima

FOREIGN PATENT DOCUMENTS

JP 2002203321 7/2002

* cited by examiner

*Primary Examiner*—Hai Pham (57) ABSTRACT

A method for labeling an optically writable label side of an optical disc of an embodiment of the invention rotates the optical disc such that an optical marking mechanism passes adjacent to a track of the optically writable label side of the optical disc a number of times greater than one. During each pass adjacent to the track by the optical marking mechanism, the optical marking mechanism writes a mark at each desired position of a plurality of positions. Each desired position of the plurality of positions has a same number of marks written thereto by the optical marking mechanism equal to the number of times the optical marking mechanism passes adjacent to the track.

24 Claims, 5 Drawing Sheets

OPTICALLY MARKING THE LABEL SIDE OF AN OPTICAL DISC

BACKGROUND OF THE INVENTION

Many types of optical discs include a data side and a label side. The data side is where the data is written to, whereas the label side allows the user to label the optical disc. Unfortunately, labeling can be an unprofessional, laborious, and/or expensive process. Markers can be used to write on optical discs, but the results are often decidedly unprofessional looking. Special pre-cut labels that can be printed on with inkjet or other types of printers can also be used, but this is a laborious process: the labels must be carefully aligned on the discs, and so on. Special-purpose printers that print directly on the discs may be used, but such printers are relatively expensive. In the patent application entitled "Integrated CD/DVD Recording and Label" [attorney docket 10011728-1], filed on Oct. 11, 2001, and assigned Ser. No. 09/976,877, a solution to these difficulties is described, in which a laser is used to label optical discs.

To optically write marks to optically writable label sides of optical discs, a laser is turned on adjacent to desired positions of the label side of an optical disc as the disc rotates. The material from which the label sides of the optical discs are made may need the laser to remain positioned adjacent to each desired position of the label side of an optical disc for a given length of time in order to optically write a mark of sufficient contrast. This length of time places a constraint on the rotational speed of the optical disc, and the rotational speed of the disc may need to be slower than when, for instance, the optically writable data sides of optical discs are written to. The motors typically employed in mass storage devices may not able to rotate an optical disc at this desired slower speed with the same rotational accuracy at which they are able to rotate the disc at higher speeds, potentially causing less than optimal labeling quality.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Multiple-Pass Writing to Optically Writable Label Side Tracks of Optical Disc

Figure 1:
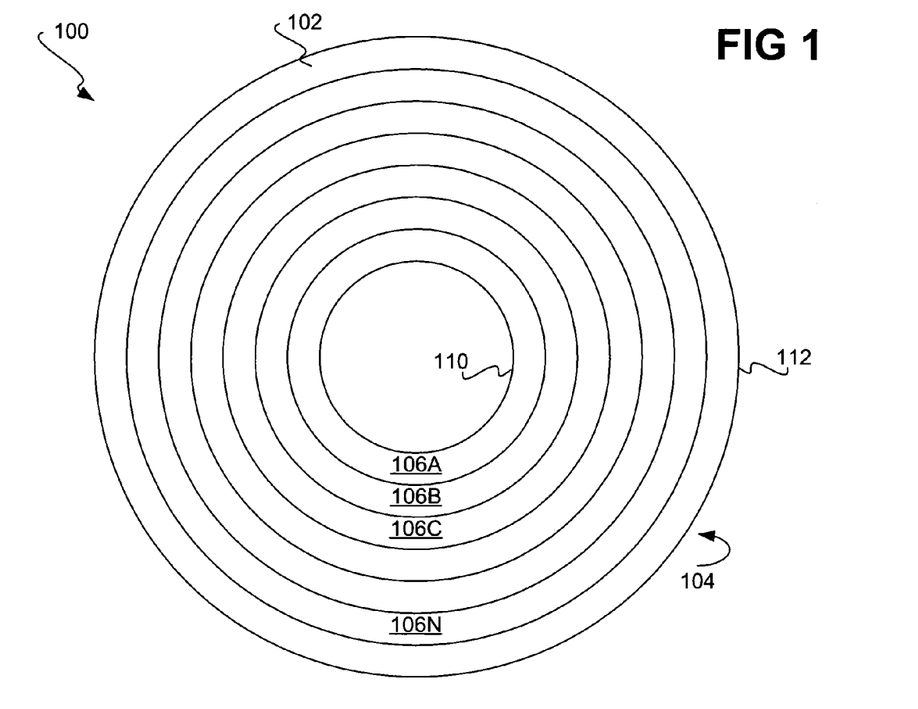
FIG. 1 is a diagram of an optical disc having an optically writable label side, according to an embodiment of the invention.

FIG. 1 shows an optical disc 100, according to an embodiment of the invention. The optical disc 100 may be a compact disc (CD), a digital versatile disc (DVD), or another type of optical disc. The optical disc 100 has an optically writable label side 102, which is shown in FIG. 1, and an optically writable data side 104 on the opposite side of the optical disc 100. An example of the optically writable label side 102 is particularly disclosed in the patent application entitled "Integrated CD/DVD Recording and Label" [attorney docket 10011728-1], filed on Oct. 11, 2001, and assigned Ser. No. 09/976,877. The optically writable label side 102 may be written to in color and/or in black-and-white or monochrome.

The optical disc 100 has an inside edge 110 and an outside edge 112. The optical disc 100 also has a number of concentric circular tracks 106A, 106B, 106C, . . . , 106N, collectively referred to as the tracks 106, extending from the inside edge 110, or inside diameter, to the outside edge 112, or outside diameter. An optical marking mechanism, such as a laser, may write marks to pixels, or positions, of the tracks 106. For instance, as the optical disc 100 rotates, the laser is turned on while positioned adjacent to a given position or pixel to write a mark at that position or pixel. There may be 700, 800, or more or less of the tracks 106 on an exemplary optical disc.

It is noted that in at least some embodiments of the invention, the tracks 106 are not physical tracks imprinted on or part of the optical disc 100, but rather are a byproduct of how optically writing to the label side 102 of the optical disc 100 is accomplished; that is, on a track-by-track basis. Therefore, the tracks 106 are referential in nature, and not physical in nature. Furthermore, whereas embodiments of the invention are described herein in relation to concentric circular tracks, as depicted in FIG. 1, other types of track schemes may also be employed, such as tracks that spiral outward from the inside edge 110 and end at the outside edge 112.

Figure 2:
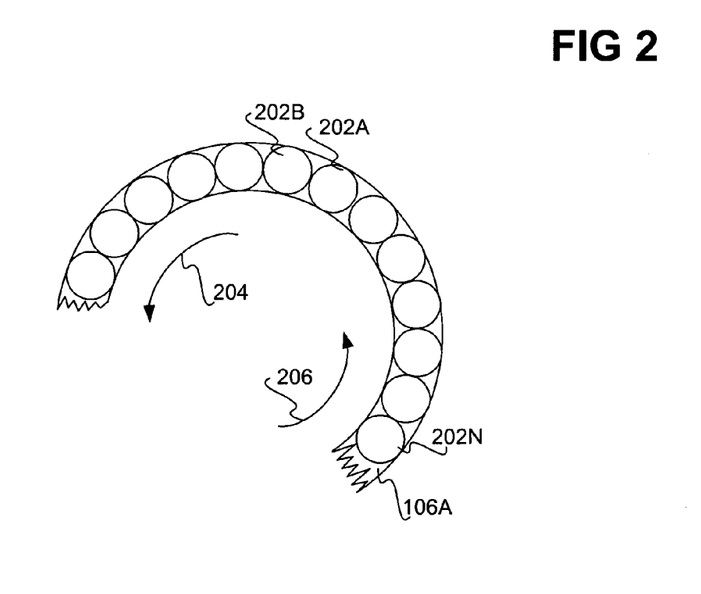
FIG. 2 is a diagram of a portion of an optically writable label side track of an optical disc in detail, according to an embodiment of the invention.

FIG. 2 shows a portion of the track 106A in more detail, according to an embodiment of the invention. The track 106A is depicted for representative and example purposes, and the other of the tracks 106 are similar. The track 106A has a number of positions 202A, 202B, . . . , 202N, collectively referred to as the positions 202, radially around the track 106A, as indicated by the arrows 204 and 206. An optical marking mechanism, such as a laser, may write marks to any of the positions 202. As the optical disc 100 rotates, different ones of the positions 202 are under the laser. While a desired one of the positions 202 is under the laser, the laser is turned on, to write a mark at the desired position.

Rotational accuracy may be higher when the optical disc 100 is rotated at a higher speed than when the optical disc 100 is rotated at a lower speed. Rotational accuracy ensures that the laser is correctly located adjacent a specified desired position when the laser is turned on. That is, rotational accuracy determines how accurately the laser can be positioned when the optical disc 100 is rotated at a given speed, so that the laser can be appropriately turned on to write a mark at a given position. If rotational accuracy is not sufficiently high, then the desired position at which the laser writes a mark may be undesirably off to the left or the right, decreasing labeling quality. Rotational accuracy typically increases when the optical disc 100 is rotated at a higher speed, because friction and stiction are less of an issue when the optical disc 100 is rotated at a higher speed, as compared to when the optical disc 100 is rotated at a lower speed.

In one embodiment, rotational accuracy is greater when the optical disc 100 is rotated at relatively faster speeds. For example, rotational accuracy may be greater when the optical disc is rotated at speeds equal to or greater than substantially 500 revolutions-per-minute (rpm), as compared to when the optical disc is rotated at speeds equal to or less than substantially 250 rpm. At higher speeds, the rotational accuracy may be greater than substantially 99.998%, whereas at lower speeds, the rotational accuracy may be less than substantially 99.9%. That is, the rotational accuracy differential of the optical disc 100 between faster and slower speeds may be greater than 0.098%, which is sufficiently high to affect labeling quality when the disc 100 rotates at slower speeds as compared to when the disc 100 rotates at higher speeds. As can be appreciated by those of ordinary skill within the art, the specific numbers and accuracies indicated herein are for example purposes, and do not serve to limit any and all embodiments of the invention.

To ensure that the size of each of the positions 202 remains the same when rotating at faster speeds as compared to at slower speeds, the length of time for which the laser or other optical marking mechanism is turned on for a given position or pixel is decreased at faster speeds. This is done because the disc continues to rotate while the laser is on. However, the material from which the optically writable label side 102 of the optical disc 100 may be such that this lesser length of time is insufficient for the laser to write marks at positions that have a desired contrast or darkness. To achieve the desired contrast or darkness requires additional exposure to the laser. Therefore, the optical marking mechanism may pass adjacent to each track of the optically writable label side 102 more than once, where each position to which a mark is to be written has the laser turned on adjacent thereto during each pass.

Figure 3A:
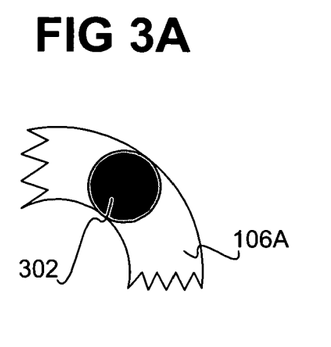
FIGS. 3A and 3B are diagrams illustrating writing to the same position of an optically writable label side track of an optical disc during multiple passes, according to an embodiment of the invention.
Figure 3B:
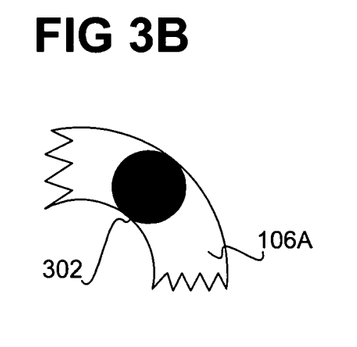

FIGS. 3A and 3B show a single position 302 of the track 106A of the optically writable label side 102 of the optical disc 100 after the optical marking mechanism has written a mark thereto during a first pass and a second pass, respectively, according to an embodiment of the invention. In FIG. 3A, the position 302 has a relatively light contrast or darkness resulting from the optical marking mechanism writing a mark to the position 302 for a relatively brief length of time. Thereafter, the optical marking mechanism passes adjacent to the track 106A a second time. In FIG. 3B, the position 302 now has a relatively dark contrast or darkness, because the optical writing mechanism has written another mark to the same position 302. That is, writing a mark to the position 302 during each of two passes adjacent to the track 106A results in the contrast or darkness of the position 302 being more optimal than just writing a mark to the position 302 during one pass adjacent to the track 106A. In one embodiment, the optical marking mechanism writes a mark to the position 302 during each pass adjacent to the position 302 with the same marking intensity.

As can be appreciated by those of ordinary skill within the art, the number of times the optical marking mechanism passes adjacent to each position may be more than two, and the two passes indicated in the scenario of FIGS. 3A and 3B is for example purposes. Also, the final contrast or darkness resulting from writing a mark to the position 302 during each of more than one pass adjacent to the track 106A while the optical disc 100 rotates at a relatively faster speed may be substantially the same as that resulting from writing a mark to the position 302 during a single pass adjacent to the track 106A while the disc 100 rotates at a relatively slower speed. The faster speed at which the optical disc 100 rotates may in one embodiment necessitate the multiple passes adjacent to each position to result in the same contrast or darkness as rotating the optical disc 100 at a slower speed does. Furthermore, the final mark size resulting from writing a mark to the position 302 during each of more than one pass adjacent to the track 106A while the optical disc 100 rotates at a relatively faster speed may be substantially the same as the mark size resulting from writing a mark to the position 302 during a single pass adjacent to the track 106A while the disc 100 rotates at a relatively slower speed.

In one embodiment, rotating the optical disc 100 at a given lower speed may allow for optimal optical densities of marks written to positions on the optically writable label side 102 of the optical disc 100 after just a single pass of the optical marking mechanism adjacent to each position. However, the rotational accuracy at this lower speed may be undesirable. When increasing the speed at which the optical disc 100 rotates by a given multiple in order to increase the rotational accuracy of the optical disc 100, in one embodiment the number of times the optical marking mechanism passes adjacent to each position of the label side 102 is increased by at least the given multiple. For example, if the speed of rotation of the optical disc 100 increases from 250 rpm to 500 rpm to increase rotational accuracy, then the number of times the optical marking mechanism passes adjacent to each position of the label side 102 is equal to or greater than (500/250)=2.

Furthermore, in one embodiment, when increasing the speed at which the optical disc 100 is rotated, the time during which the optical marking mechanism is positioned adjacent to any given position or pixel of the optically writable label side 102 of the disc 100 is decreased so that the size of each position or pixel remains the same. Therefore, the cumulative time the optical marking mechanism is adjacent to a desired position or pixel being written to, during the total number of passes of the optical marking mechanism adjacent to this position, at the faster speed may be equal to or greater than the length of time that the optical marking mechanism is adjacent to this position during a single pass at the lower speed. That is, the cumulative length of time incurred by the optical marking mechanism over all the passes in writing a mark to a desired position while the optical disc 100 rotates at the faster speed is equal to or greater than the length of time that the mechanism incurs in writing a mark to the position in a single pass while the disc 100 rotates at the slower speed.

Figure 4:
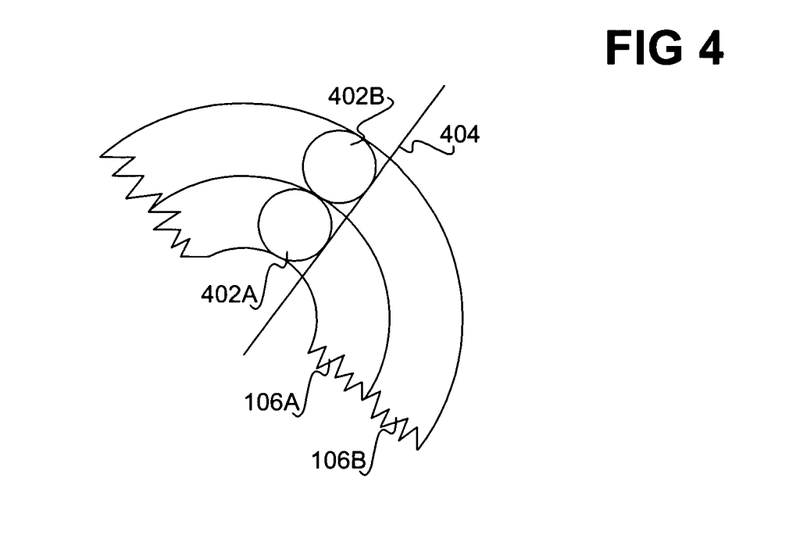
FIG. 4 is a diagram of the starting positions of two optically writable tracks of the label side of an optical disc, according to an embodiment of the invention.

FIG. 4 shows a portion of the tracks 106A and 106B of the optically writable label side 102 of the optical disc 100, according to an embodiment of the invention. The track 106A includes a starting position 402A, which is the first position at which an optical marking mechanism, such as a laser, is configured to write a mark during each pass adjacent to the track 106A. Similarly, the track 106B includes a starting position 402B, which is the first position at which the optical marking mechanism is able to write a mark during each pass adjacent to the track 106B. Therefore, the starting points of the optical marking mechanism of the multiple passes adjacent to a given track of the label side 102 are identical in one embodiment. Furthermore, the starting points of the optical marking mechanism of the multiple passes adjacent to different tracks of the label side 102 are angularly identical, as indicated by the radial line 404, in one embodiment. That is, the starting position 402B of the track 106B is tangential to the line 404, as is the starting position 402A of the track 106A, such that the starting positions 402A and 402B are angularly identical. It is noted that the scenario depicted in FIG. 4, where the starting positions 402 of the tracks 106 are angularly identical, is exemplary of one embodiment of the invention. In other embodiments, the starting positions of different tracks may not be angularly identical.

Mass Storage Device and Methods

Figure 5:
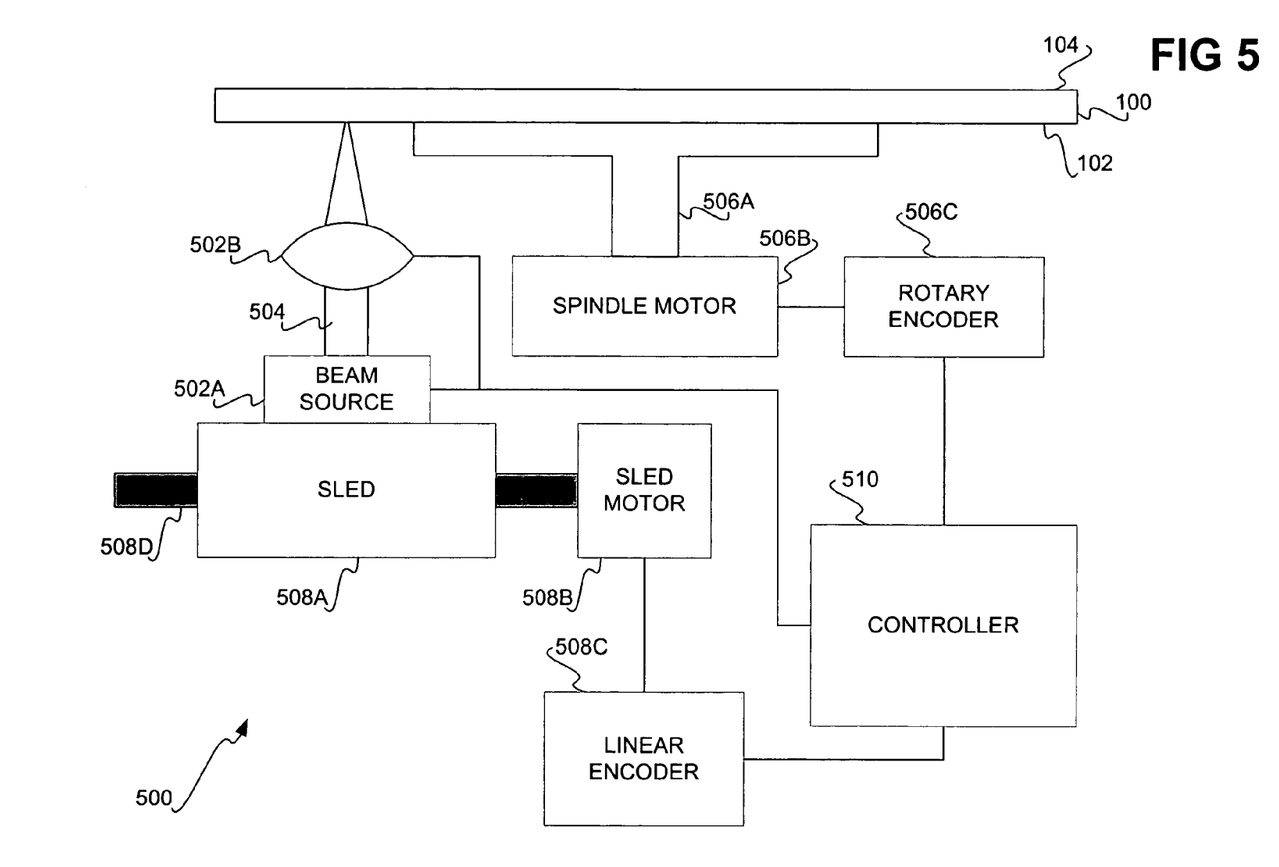
FIG. 5 is a diagram of a mass storage device, according to an embodiment of the invention.

FIG. 5 shows a mass storage device 500, according to an embodiment of the invention. The mass storage device 500 is for reading from and/or writing to the optical disc 100. More specifically, the mass storage device 500 is for reading from and/or writing to an optically writable data surface of the optical disc 100, and/or an optically writable label surface of the optical disc 100, in accordance with the preceding section of the detailed description. The mass storage device 500 includes a beam source 502A and an objective lens 502B, which are collectively referred to as the optical marking mechanism 502. The storage device 500 also includes a spindle 506A, a spindle motor 506B, and a rotary encoder 506C, which are collectively referred to as the first motor mechanism 506. The rotary encoder 506C is depicted in FIG. 5 as communicatively coupled to the spindle motor 506B, such that it receives or detects signals from the motor 506B. By comparison, in another embodiment of the invention, the rotary encoder 506C may receive or detect signals from the optical disc 100 directly, instead of from the motor 506B. The device 500 further includes a sled 508A, a sled motor 508B, a linear encoder 508C, and a rail 508D, which are collectively referred to as the second motor mechanism 508. Finally, the mass storage device 500 includes a controller 510.

The optical marking mechanism 502 focuses an optical beam 504, such as a laser, on the optical disc 100, for at least marking the label side 102 of the optical disc 100, and which also may be used to read from the label side 102 of the disc 100, as well as read from and/or write to the data side 104 of the disc 100. Specifically, the beam source 502A generates the optical beam 504, which is focused through the objective lens 502B onto the optical disc 100, such as in a manner known to those of ordinary skill within the art. The first motor mechanism 506 rotates the optical disc 100. Specifically, the optical disc 100 is situated on the spindle 506A, which is rotated, or moved, by the spindle motor 506B to a given position specified by the rotary encoder 506C communicatively coupled to the spindle motor 506B. The rotary encoder 506C may include hardware, software, or a combination of hardware and software.

The speed at which the first motor mechanism 506 rotates the optical disc 100 is in one embodiment the same for writing marks to the label side 102 of the optical disc 100 as it is for reading from or writing to the data side 104 of the optical disc 100. The controller 510 thus causes the optical marking mechanism 502 to pass adjacent to each position on the label side 102 to have a mark written thereto more than once, at a given marking intensity of the laser during each pass, as has been described. The disc 100 is rotated by the first motor mechanism 506 at a substantially constant angular speed for a given track, which can change from track to track to achieve constant linear velocity in one embodiment of the invention.

The second motor mechanism 508 moves the optical marking mechanism 502 radially relative to the optical disc 100. Specifically, the optical marking mechanism 502 is situated on the sled 508A, which is moved on the rail 508D by the sled motor 508B to a given position specified by the linear encoder 508C communicatively coupled to the sled motor 508B. The linear encoder 508C may include hardware, software, or a combination of hardware and software. The controller 510 in one embodiment causes the optical marking mechanism 502 to radially move from one track of the label side 102 of the optical disc 100 to another track of the label side 102 after the mechanism 502 has passed adjacent to the former track more than once, as has been described. That is, the controller 510 advances the optical marking mechanism 502 and causes the mechanism 502 to multiply pass adjacent to the tracks, by controlling the first and the second motor mechanisms 506 and 508. The controller 510 may maintain a constant marking intensity of the optical marking mechanism 502 during each pass adjacent to a track.

As can be appreciated by those of ordinary skill within the art, the components depicted in the mass storage device 500 are representative of one embodiment of the invention, and do not limit all embodiments of the invention. Other control approaches can also be employed. As only one example, the sled 508A may be positioned with the sled motor 508B, with finer adjustment obtained using a voice coil attached to the beam source 502A and/or the objective lens 502B.

Figure 6:
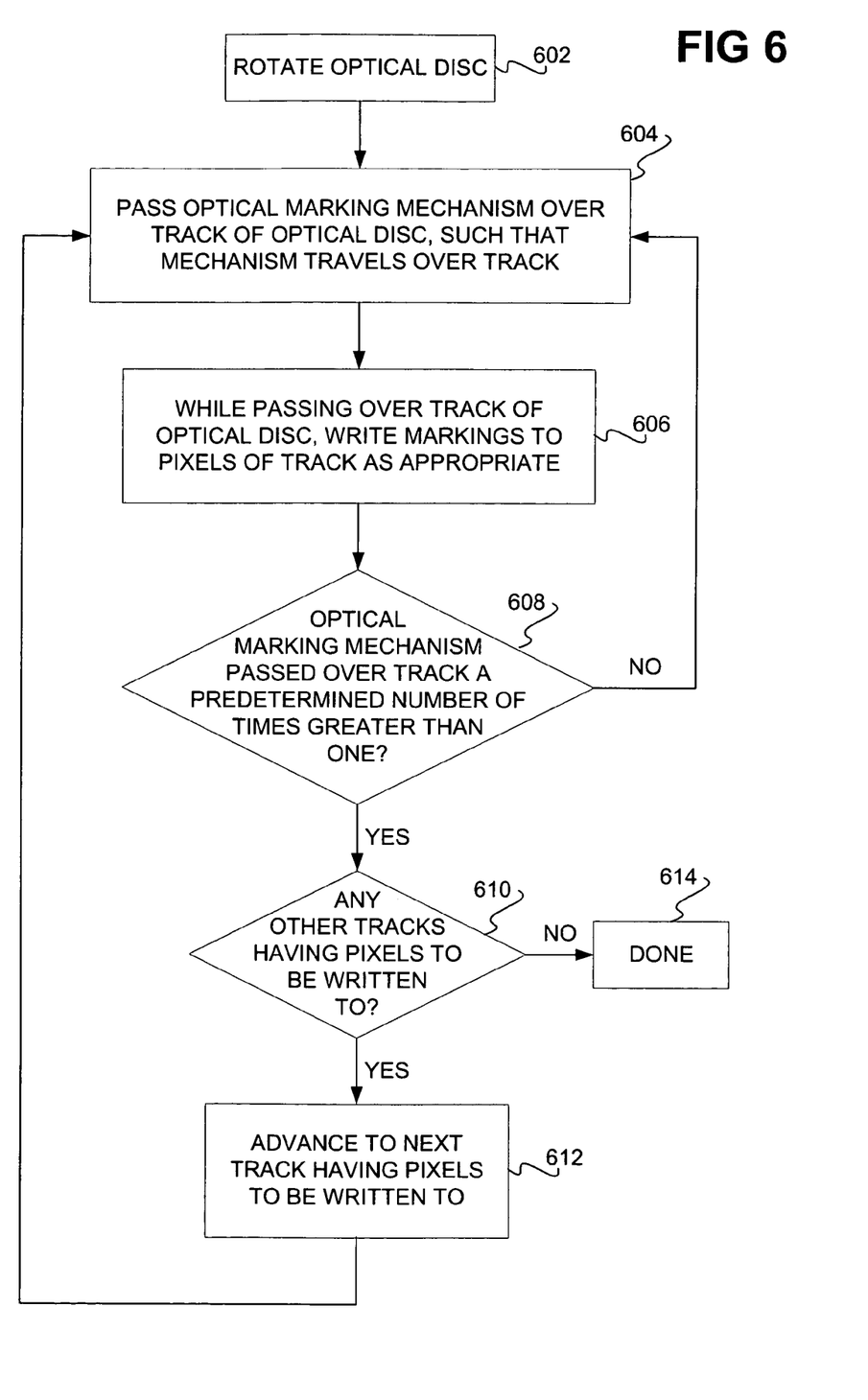
FIG. 6 is a flowchart of a method for optically labeling the optically writable label side of an optical disc with an image, according to an embodiment of the invention.

FIG. 6 shows a method 600 for optically writing an image on the optically writable label side 102 of the optical disc 100, according to an embodiment of the invention. The mass storage device 500 of FIG. 5 may perform at least part of the method 600 in one embodiment of the invention. For instance, the controller 510 may perform the method 600. Furthermore, the method 600 may be implemented as a computer program stored on a computer-readable medium and executed by the controller 510 or a processor. The computer-readable medium may be a volatile or non-volatile medium, and a semiconductor, magnetic, and/or optical medium in one embodiment of the invention.

First, the optical disc 100 is rotated at a substantially constant angular speed for a given track (602) in one embodiment. The optical marking mechanism 502 passes adjacent to a track of the optically writable label side 102 of the optical disc 100, such that it can be said that the mechanism 502 travels adjacent to the track (604). While the optical marking mechanism 502 passes adjacent to the track, it writes markings to pixels, or positions, of the track as appropriate (606). That is, the mechanism 502 writes markings at desired positions of the track.

The optical marking mechanism 502 is to pass adjacent to the track for a predetermined number of times greater than once, writing to the same pixels, or positions, of the track during each pass at the same marking intensity. Therefore, if the optical marking mechanism 502 has not passed adjacent to the track the predetermined number of times yet (608), then the method 600 repeats 604 and 606. Once the mechanism 502 has passed adjacent to the track the predetermined number of times (608), and if there are further tracks that have pixels to which markings are to be written (610), then the optical marking mechanism 502 is advanced to the next track having pixels to which markings are to be written (612), and the method 600-is repeated at 604. Once there are no further tracks that have pixels to which markings are to be written (610), the method 600 is finished (614).

Figure 7:
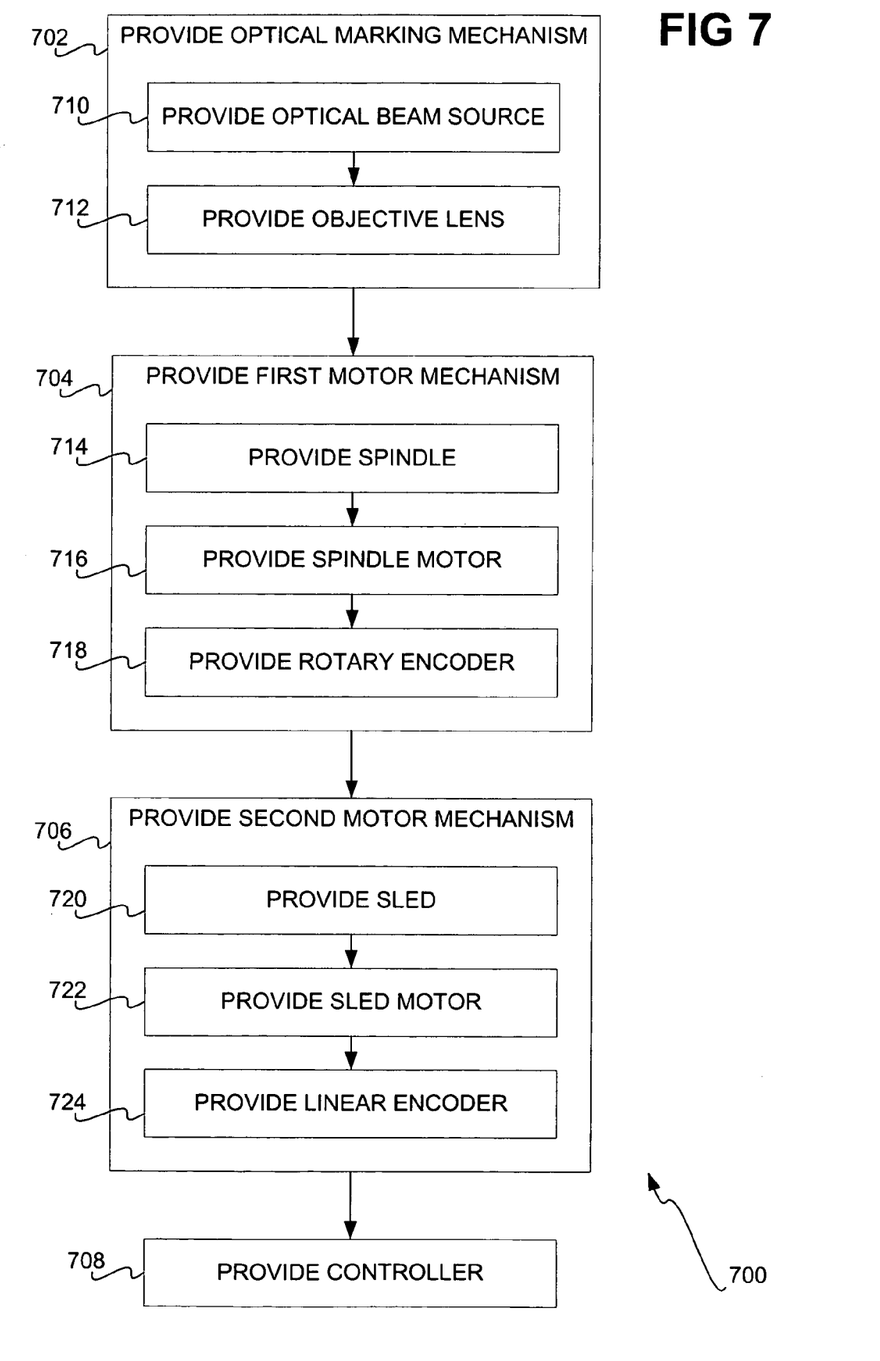
FIG. 7 is a flowchart of a method for manufacturing the mass storage device of FIG. 6, according to an embodiment of the invention.

FIG. 7 shows a method of manufacture 700 for the mass storage device 500 of FIG. 5, according to an embodiment of the invention. The method 700 includes providing the optical marking mechanism 502 (702), providing the first motor mechanism 506 (704), providing the second motor mechanism 508 (706), and providing the controller 510 (708). In one embodiment, providing the optical marking mechanism 502 includes providing the optical beam source 502A (710) and the objective lens 502B (712), whereas providing the first motor mechanism 506 in one embodiment includes providing the spindle 506A (714), the spindle motor 506B (716), and the rotary encoder 506C (718). Finally, providing the second motor mechanism 508 in one embodiment includes providing the sled 508A (720), the sled motor 508B (722), and the linear encoder 508C (724).

CONCLUSION

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

I claim:

1. A method for labeling an optically writable label side of an optical disc comprising:
    rotating the optical disc such that an optical marking mechanism passes adjacent to a track of the optically writable label side of the optical disc a number of times greater than one;
    during each pass adjacent to the track by the optical marking mechanism, writing a mark at each desired position of a plurality of positions by the optical marking mechanism,
    such that each desired position has a same number of marks written thereto by the optical marking mechanism equal to the number of times the optical marking mechanism passes adjacent to the track,
    wherein each desired position of each of a plurality of tracks on the optically writable label side of the optical disc has a same number of marks written thereto.

2. The method of claim 1, wherein a starting point of each pass adjacent to the track by the optical marking mechanism is identical.

3. The method of claim 1, further comprising advancing the optical marking mechanism from the track to a next track of the optically writable label side of the optical disc.

4. The method of claim 1, wherein rotating the optical disc comprises rotating the optical disc at a first speed greater than a second speed, the first speed equal to or greater than the number of times the optical marking mechanism passes adjacent to the track of the optically writable label side of the optical disc multiplied by the second speed.

5. The method of claim 4, wherein the first speed is equal to the number of times the optical marking mechanism passes adjacent to the track of the optically writable label side of the optical disc multiplied by the second speed.

6. The method of claim 4, wherein the second speed is less than or equal to substantially 250 revolutions-per-minute (rpm), and the first speed is equal to or greater than substantially 500 rpm.

7. The method of claim 4, wherein at the first speed rotational accuracy of the optical disc is greater than substantially 99.998%, whereas at the second speed rotational accuracy of the optical disc is less than substantially 99.9%.

8. The method of claim 4, wherein a rotational accuracy differential of the optical disc between the first speed and the second speed is greater than 0.098%.

9. The method of claim 4, wherein a cumulative length of time incurred by the optical marking mechanism in writing the number of marks to each desired position while the optical disc rotates at the first speed is equal to or greater than a length of time that the optical marking mechanism would incur in writing a single mark to each desired position if the optical disc was rotating at the second speed.

10. The method of claim 9, wherein the cumulative length of time incurred by the optical marking mechanism in writing the number of marks to each desired position while the optical disc rotates at the first speed is equal to the length of time that the optical marking mechanism would incur to write the single mark to each desired position if the optical disc was rotating at the second speed.

11. The method of claim 4, wherein a darkness of each desired position resulting from the optical marking mechanism writing the number of marks to each desired position while the optical disc rotates at the first speed is substantially as dark as a darkness of each desired position that would result from the optical marking mechanism writing a single mark to each desired position if the optical disc was rotating at the second speed.

12. The method of claim 4, wherein a mark size at each desired position of resulting from the optical marking mechanism writing the number of marks to each desired position while the optical disc rotates at the first speed is substantially equal to a mark size at each desired position of the plurality of positions that would result from the optical marking mechanism writing a single mark to each desired position if the optical disc was rotating at the second speed.

13. The method of claim 1, wherein, during each pass adjacent to the track by the optical marking mechanism, writing the mark at each position of the plurality of positions by the optical marking mechanism comprises writing the mark at each position with an identical marking intensity of the optical marking mechanism.

14. A mass storage device comprising:
    an optical marking mechanism to at least optically write markings on a plurality of tracks of an optically writable label side of an optical disc;
    a first motor mechanism to rotate the optical disc;
    a second motor mechanism to move the optical marking mechanism radially relative to the optical disc; and,
    a controller to cause the optical marking mechanism to pass adjacent to each track of the plurality of tracks more than once and to cause the optical marking mechanism to write a mark at each position of a plurality of positions for each pass adjacent to each track at a substantially constant marking intensity to achieve a desired contrast at each position, the desired contrast unachievable by writing a single mark in a single pass at the substantially constant marking intensity while the optical disc rotates, wherein each desired position of each of the plurality of tracks on the optically writable label side of the optical disc has a same number of marks written thereto.

15. The mass storage device of claim 14, wherein the optical disc is rotate at an angular speed that provides for greater positional accuracy than rotating the optical disc at a lesser angular speed does, but that necessitates passing adjacent to each track more than once to achieve the desired contrast.

16. The mass storage device of claim 14, wherein the optical marking mechanism comprises an optical beam generator.

17. The mass storage device of claim 14, wherein the controller is configured to advance the optical marking mechanism from a given one of the tracks to a next track of the optically writable label side by controlling the first and second motor mechanisms.

18. A mass storage device comprising:
    marking means for optically writing markings on a plurality of tracks of an optically writable label side of an optical disc;
    means for rotating the optical disc;
    means for moving the marking means radially relative to the optical disc; and,
    means for causing the marking means to write a mark at each position of a plurality of positions on each track at a predetermined marking intensity more than once so as to achieve a desired marking intensity at each position on each track,
    wherein each desired position of each of the plurality of tracks on the optically writable label side of the optical disc has a same number of marks written thereto.

19. A method for manufacturing a mass storage device comprising:
    providing an optical marking mechanism that is able to at least optically write markings on a plurality of tracks of an optically writable label side of an optical disc;
    providing a plurality of motor mechanisms that are able to rotate the optical disc and to move the optical marking mechanism radially relative to the optical disc; and,
    providing a controller that is able to cause the optical marking mechanism to pass adjacent to each track of the plurality of tracks more than once and write markings to a same plurality of positions during each pass adjacent to the track,
    wherein each position of each of the plurality of tracks on the optically writable label side of the optical disc has a same number of marks written thereto.

20. The method of claim 19, wherein providing the plurality of motor mechanisms comprises providing the plurality of motor mechanism that is able to rotate the optical disc at a first speed that necessitates the optical marking mechanism to pass adjacent to each track of the plurality of tracks more than once to achieve a desired marking intensity but which allows for rotational accuracy of the optical disc greater than a second speed slower than the first speed does.

21. An optical disc comprising:
    an optically writable label side;
    a plurality of tracks definable on the optically writable label side;
    a plurality of pixels definable on each track of the plurality of tracks; and,
    a plurality of multiple pass-written markings markable on the plurality of pixels on each track of the plurality of tracks, the multiple-pass written markings having marking intensities resulting from optically writing on the plurality of pixels at a substantially constant lesser marking intensity more than once,
    wherein each of a plurality of desired positions of each of the plurality of tracks on the optically writable label side of the optical disc has a same number of marks written thereto.

22. The optical disc of claim 21, further comprising an optically writable data side opposite to the optically writable label side.

23. A computer-readable medium having a computer program stored thereon to perform a method comprising:
    causing an optical disc to rotate;
    causing an optical marking mechanism to pass adjacent to a plurality of positions on an optically writable label side of the optical disc a number of times greater than one; and,
    causing the optical marking mechanism to write a mark at each position of the plurality of positions during each pass, resulting in a contrast at each position substantially identical to a contrast that would result from causing the optical marking mechanism to write a single mark at each position if the optical disc was rotated at a slower angular speed,
    wherein each desired position of each of the plurality of tracks on the optically writable label side of the optical disc has a same number of marks written thereto.

24. The medium of claim 23, wherein causing the optical marking mechanism to write the mark at each position comprises causing the optical marking mechanism to write the mark at each position with a constant marking intensity.

* * * * *